Patented Nov. 23, 1943

2,335,101

UNITED STATES PATENT OFFICE 2,335,101

SOLUTION OF METALLO-AMMONIUM NAPHTHENATES

Thomas R. Belzer and Harold Schiller, Los Angeles, Calif., assignors to Socony-Vacuum Oil Company, Incorporated, New York, N. Y., a corporation of New York No Drawing. Application March 11, 1941,
Serial No. 382,757

1 Claim. (Cl. 167—30)

In the prior art exemplified by United States Patent 2,157,727 to Ronald A. Baker, water-soluble complexes of ammonia with zinc or copper and the naphthenic acids are prepared by adding a water-soluble salt of the metal, e. g., copper sulfate, to aqueous ammonia, thus producing the well known copper-ammonium sulfate, and then adding naphthenic acids in quantity sufficient to produce the naphthenate of the metal. The quantity of ammonia required is that which produces the metallo-ammonium salt plus the quantity required to saponify the naphthenic acids plus a small excess.

These complexes, which are used in highly diluted form as agents for preserving fabrics from rot and for protecting plant life, depend for their effectiveness on the fact that they are stable only in aqueous solution and in the presence of the alkaline ingredient, in consequence of which the naphthenate, which is itself insoluble in water or substantially so, is precipitated when films of the solution produced by immersion or by spraying lose their water and ammonia by evaporation.

In the method of this patent the ammonium salt corresponding to the metallic salt taken (i. e., ammonium sulfate in case copper or zinc sulfate is used) remains in the film produced by precipitation on drying, and the presence of this by-product salt is objectionable for several reasons. First, the presence of the salt in a treated fabric materially adds to the stiffening of the fabric by the treatment. Second, if heat be applied to dry the wet fabric there is likely to be a decomposition of the normal ammonium sulfate to ammonium hydrogen sulfate and sulfuric acid, which attack both the cloth and the naphthenate film. Finally, if the fabric be washed or leached after drying, to remove the ammonium salt, there is likely to be some hydrolysis, causing some of the naphthenate film to flake off and thus render the fabric subject to spot rotting.

Another drawback to the ammonia process is that the concentration of the active metal in the strongest solution possible to prepare is very low, being of the order of four percent by weight in the case of copper.

We have improved on this process in first preparing the heavy metal naphthenate in substantially water-free and salt-free form; in placing this metallic soap in solution in a water-miscible solvent for transportation and for the convenience of the user, and in adding the ammonia or amine required to make the naphthenate soluble in water only when the product is to be used.

In this manner we provide the consumer with a liquid product which may be measured for dilution; obtain a product in a much higher degree of concentration (of the order of three times that previously possible) with a corresponding saving in transportation costs; avoid the risk of loss of ammonia and consequent partial precipitation of the naphthenate in transit or storage, and eliminate water-soluble salts from the ultimate film of naphthenate.

As a first step we prepare the naphthenate of a metal having preservative, fungicidal or insecticidal properties. The metals suitable for this process, so far as we are aware, are limited to cadmium, copper, cobalt, nickel, silver, and zinc, of which copper and zinc are preferable by reason of their relatively low cost. The naphthenic acids used are petroleum acids, highly purified and preferably having acid numbers ranging from 160 to 250 mgr. KOH per gram, equivalent to molecular weights ranging from 350 to 220.

The naphthenate may be prepared in any preferred manner. For example it may be produced by double decomposition between an alkali metal soap and a water-soluble salt of the heavy metal, in which case the by-product salts must be washed out and the naphthenate dehydrated by kneading or heating. Or it may be produced by double decomposition in the presence of a quantity of a petroleum solvent, the water and salts settling from the solution from which the solvent is afterward evaporated.

By whatever manner prepared the heavy metal naphthenate is substantially desiccated and freed from salts and is then brought into primary solution. For this purpose we may utilize any of the lower aliphatic alcohols or ketones boiling below about 100° Cent. Isopropyl alcohol and methyl-ethyl ketone are preferred solvents. This is simple solution and may be facilitated by the use of heat if a reflux condenser be provided.

The solution thus produced is noncorrosive to metallic containers, is indefinitely stable and may be prepared to contain from 10% to 15% by weight of the active metal.

When the alcoholic solution is to be diluted for use, we add ammonium hydroxide in such proportion as to combine with the metal of the soap to form the ammonia complex and with the naphthenic acid of the soap to form an ammonium soap. In the case of cadmium, copper, and zinc the quantity required is six mols ammonia per mol of the heavy metal, with cobalt and nickel eight mols and with silver three mols. The monamines or diamines boiling below about 100° Cent. may be substituted for ammonia with full functionality but without any advantage to offset the increased cost. The concentrated ammonia may be mixed with the primary solution or may be added to the water of dilution as preferred.

By this addition of ammonia or an amine the metallic naphthenate is rendered miscible with water without decomposition and may be diluted to any extent which may be desired if sufficient of the amine be present. For various uses it is customary to dilute it to contain from 0.1% to 0.5% by weight of the active metal, and in diluting below 1% of the metal it is necessary to add more ammonia. We therefore prefer to dilute with a mixture of water nine parts by volume and 28% aqueous ammonia one part.

We claim as our invention:

The method of bringing normally water-insoluble heavy metal naphthenates into aqueous solution which comprises: dissolving the naphthenate in a water-miscible solvent selected from the group consisting of the aliphatic alcohols and ketones boiling below about 100° Cent., and adding to the solution thus produced a solubilizing agent selected from the group consisting of ammonia and the amines boiling below about 100° Cent., together with water.

THOMAS R. BELZER.
HAROLD SCHILLER.